United States Patent
Baur

(10) Patent No.: US 11,054,439 B2
(45) Date of Patent: Jul. 6, 2021

(54) SCANNING PROBE MICROSCOPE AND METHOD FOR INCREASING A SCAN SPEED OF A SCANNING PROBE MICROSCOPE IN THE STEP-IN SCAN MODE

(71) Applicant: Carl Zeiss SMT GmbH, Oberkochen (DE)

(72) Inventor: Christof Baur, Darmstadt (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 16/395,542

(22) Filed: Apr. 26, 2019

(65) Prior Publication Data

US 2019/0250185 A1     Aug. 15, 2019

Related U.S. Application Data

(63) Continuation of application No. PCT/EP2017/077431, filed on Oct. 26, 2017.

(30) Foreign Application Priority Data

Oct. 28, 2016   (DE) .......................... 102016221319.9

(51) Int. Cl.
  *G01Q 10/04*   (2010.01)
  *G01Q 10/06*   (2010.01)
(52) U.S. Cl.
  CPC ........... *G01Q 10/045* (2013.01); *G01Q 10/06* (2013.01)
(58) Field of Classification Search
  None
  See application file for complete search history.

(56) References Cited

U.S. PATENT DOCUMENTS

| 7,129,486 | B2 * | 10/2006 | Spizig | G01Q 60/34 250/311 |
| 7,631,548 | B2 * | 12/2009 | Baba | B82Y 35/00 73/105 |
| 8,650,660 | B2 * | 2/2014 | Shi | G01Q 60/32 850/5 |
| 9,599,636 | B2 * | 3/2017 | Humphris | G01Q 10/00 |
| 2005/0050947 | A1 * | 3/2005 | Kitajima | G01Q 60/32 73/105 |
| 2009/0032706 | A1 | 2/2009 | Prater et al. | |

(Continued)

FOREIGN PATENT DOCUMENTS

| DE | 103 32 451 | 2/2005 | ............. G01N 13/16 |
| DE | 10332451 A1 * | 2/2005 | ............. G01Q 10/06 |
| DE | 10332451 B4 * | 6/2005 | ............. G01Q 10/06 |

(Continued)

OTHER PUBLICATIONS

Korean Office Action for Korean Application No. KR 10-2019-7012213 dated Apr. 27, 2020 (with English Translation).

(Continued)

*Primary Examiner* — Andrew Smyth
(74) *Attorney, Agent, or Firm* — Fish & Richardson P.C.

(57) ABSTRACT

The present invention relates to a scanning probe microscope having: (a) a scan unit embodied to scan a measuring probe over a sample surface in a step-in scan mode; and (b) a self-oscillation circuit arrangement configured to excite the measuring probe to a natural oscillation during the step-in scan mode.

27 Claims, 9 Drawing Sheets

(56) References Cited

U.S. PATENT DOCUMENTS

2012/0030845 A1* 2/2012 Fukuma ............... G01Q 10/065 850/1
2015/0013035 A1 1/2015 Humphris et al.

FOREIGN PATENT DOCUMENTS

| JP | 2004-122278 | 4/2004 | ............... B82B 3/00 |
| JP | 2004-132823 | 4/2004 | ............ G01N 13/10 |
| JP | 2004122278 A * | 4/2004 | |
| JP | 2004122278 A * | 4/2004 | |
| JP | 2004132823 A * | 4/2004 | |
| JP | 2005-172571 | 6/2005 | ............ G01N 13/16 |
| JP | 2009-109377 | 5/2009 | ............ G01N 13/16 |
| JP | 2009109377 A * | 5/2009 | |
| JP | 2014-504737 | 2/2014 | ............ G01Q 60/32 |
| JP | 2015-505617 | 2/2015 | ............ G01Q 60/32 |
| KR | 1020100068374 | 6/2010 | ............ G01Q 10/00 |
| WO | WO 2012/104625 | 8/2012 | ............ G01Q 10/06 |
| WO | WO 2015/011448 | 1/2015 | ............ G01Q 10/06 |
| WO | WO-2015011448 A1 * | 1/2015 | ........... G01Q 10/065 |

OTHER PUBLICATIONS

International Search Report and Written Opinion of the International Searching Authority for International Application No. PCT/EP2017/077431 dated Feb. 5, 2018.

Hosaka et al., "Pico-Newton controlled step-in mode NC-AFM using a quadrature frequency demodulator and a slim probe in air for CD-AFM", *Key Engineering Materials*, vol. 497, pp. 95-100 (Dec. 22, 2011).

Hosaka et al., "Step-In Mode NC-AFM Using a Quadrature Frequency Demodulator for Observing High-Aspect Ratio Structures in Air", *Journal of Surface Science and Nanotechnology*, vol. 9, pp. 122-125 (Mar. 30, 2011).

Koyabu et al., "In-line Atomic Force Microscope for Semiconductor Process Evaluation", *Hitachi Review*, vol. 51, No. 4, pp. 130-135 (2002).

Manning et al., "Self-oscillating tapping mode atomic force microscopy", *Review of Scientific Instruments*, vol. 74, No. 9, pp. 4220-4222 (Sep. 2003).

Nikolov et al, "All-digital PLL System for Self-oscillation Mode of Microcantilevers with Integrated Bimorph Actuator and Piezoresistive Readout", *Sensors & Transducers Journal*, vol. 98, Issue. 11, pp. 45-53, ISSN 1726-5479 (Nov. 2008).

Rogers et al., "Improving tapping mode atomic force microscopy with piezoelectric cantilevers", *Ultramicroscopy* 100, pp. 267-276 (2004).

Watanabe et al., "An Advanced AFM Sensor: Its Profile Accuracy and Low Probe Wear Property for High Aspect Ratio Patterns", *Proceedings of SPIE*, vol. 6518, pp. 65183L-1-5183L-12 (2007).

Notice of Allowance from the Korean Intellectual Property Office for Korean Patent Application No. KR 10-2019-7012213 dated Oct. 22, 2020.

Notification of Reasons for Rejection from the Japanese Patent Office for Japanese Application No. JP 2019-521770 dated Jul. 21, 2020 (with English Translation).

* cited by examiner

SCANNING PROBE MICROSCOPE AND METHOD FOR INCREASING A SCAN SPEED OF A SCANNING PROBE MICROSCOPE IN THE STEP-IN SCAN MODE

CROSS-REFERENCE TO RELATED APPLICATIONS

This application is a continuation of and claims priority under 35 U.S.C. § 120 from PCT Application PCT/EP2017/077431, filed on Oct. 26, 2017, which claims priority from German Application 10 2016 221 319.9, filed on Oct. 28, 2016. The entire contents of each of these priority applications are incorporated herein by reference.

TECHNICAL FIELD

The present invention relates to a scanning probe microscope and a method for increasing a scan speed of a scanning probe microscope operating in a step-in scan mode.

BACKGROUND

Scanning probe microscopes use a measuring probe to scan a sample or the surface thereof and thus yield measurement data for producing a representation of the topography of the sample surface. Scanning probe microscopes are abbreviated hereinafter to SPM. Different SPM types are differentiated depending on the type of interaction between the measuring tip of a measuring probe and the sample surface.

In the microscope referred to as atomic force microscope (AFM) or scanning force microscope (SFM), a measuring tip of a measuring probe is deflected by atomic forces of the sample surface, typically attractive van der Waals forces and/or repulsive forces of the exchange interaction. The deflection of the measuring tip is proportional to the force acting between the measuring tip and the sample surface, and this force is used to determine the surface topography of the sample.

In addition to the AFM, there are a multiplicity of further apparatus types which are used for specific fields of application, such as e.g. scanning tunneling microscopes, magnetic force microscopes or optical and acoustic near-field scanning microscopes.

Scanning probe microscopes can be used in different operating modes. In a first contact mode, the measuring tip of a measuring probe is placed onto the sample surface and scanned over the sample surface in this state. Here, the deflection of a cantilever or spring beam of the measuring probe, which carries the measuring tip, can be measured and used for imaging the sample surface. In a second contact mode, the deflection of the cantilever is kept constant in a closed control loop, and the distance of the SPM tracks the contour of the sample surface. In these two operating modes, firstly, the measuring tips are subject to great wear and, secondly, sensitive samples can be damaged or even destroyed by the contact with the measuring tip.

In a third operating mode, the non-contact mode, the measuring tip is brought to a defined distance from the sample surface and the cantilever of the measuring is excited to oscillate, typically at or near the resonant frequency of the cantilever. The measuring probe is then scanned over the surface of the sample. Since the measuring tip does not come into contact with the sample in this operating mode, its wear is low. However, the spatial resolution of the SPM is lower in this operating mode than in the contact operating modes and, moreover, it is difficult to determine the surface contour on account of the short range of the forces acting at the sample surface.

In a fourth operating mode, the intermittent mode (or tapping Mode™), the cantilever is likewise caused to carry out a forced oscillation, but the distance between the SPM and the sample surface is chosen such that the measuring tip reaches the sample surface only during a small part of an oscillation period. The contour of the surface of the sample is derived from the change in the frequency, the amplitude or the phase of the forced oscillation, which change is caused by the interaction of the measuring probe with the sample surface. The intermittent mode represents a compromise between the three aforementioned operating modes.

In the publication "Self-oscillating tapping mode atomic force microscopy", Rev. Scien. Instr., volume 72, number 9, pages 4220-4222, the authors L. Manning, B. Rogers, M. Jones, J. D. Adams, J. L. Fuste and S. C. Minne describe a piezoelectric micro-cantilever sensor which is used in an intermittent operating mode (or tapping Mode™).

Similar to the publication specified in the paragraph above, the article "Improving tapping mode atomic force microscopy with piezoelectric cantilevers" by B. Rogers, L. Manning, T. Sulchek, J. D. Adams in Ultramicroscopy 100 (2004), pages 267-276 likewise describes a piezoelectric micro-cantilever sensor for use in an intermittent operating mode.

In the article "All-digital PLL system for self-oscillation mode of microcantilevers with integrated bimorph actuator and piezoresistive readout" in Sensors & Transducers Journal, volume 98, issue 11, November 2008, pages 45-53, ISSN 1726-5479, the authors N. Nikolov, N. Kenarov, P. Popov, T. Gotszalk and I. Rangelow describe a self-oscillation system for a micro-cantilever with an integrated bimorph actuator and piezoresistive readout unit.

In a fifth operating mode, the step-in operating mode or simply step-in mode, the movements perpendicular to the sample surface and parallel to the sample surface are carried out sequentially. To that end, the measuring tip of the measuring probe is lowered onto the sample surface and the interaction between the sample surface and the measuring tip is measured at the same time. Afterwards, the measuring tip is brought substantially to its initial position again. Subsequently, the measuring tip is displaced by a defined section parallel to the sample surface and the analysis process is continued with a further lowering process. These relationships are illustrated schematically in FIG. 1.

In the article "In-line atomic force microscope for semiconductor process evaluation", Hitachi Review, volume 51 (2002), number 4, pages 130-135, the authors H. Koyabu, K. Murayama, Y. Kembo and S. Hosaka describe the step-in operating mode of an AFM. FIG. 1 has been taken from the last-mentioned publication.

The US patent document with the number U.S. Pat. No. 7,129,486 B2 describes the measurement and analysis of a time-force curve for a pulsed force mode (PFM) operating mode, which is similar to the step-in scan mode or the step-in operating mode.

The US patent document with the number of U.S. Pat. No. 7,631,548 B2 considers the step-in operating mode of a scanning probe microscope and describes how the detected time curves of the deflection signal can be used to analyze a sample surface.

FIG. 2, which reproduces the time curves of lowering a measuring tip of a cantilever of a measuring probe onto the sample surface and withdrawing the measuring tip from the probe, has been taken from the last-mentioned patent application. A characteristic feature of the step-in operating mode is the inadvertent excitation of an oscillation of the cantilever of a measuring probe, said oscillation being caused, for example, by the adhesion forces between the sample surface and the measuring tip. During the withdrawal of the measuring probe from the sample surface, when the measuring tip of the measuring probe lifts away from the sample surface, these forces excite an oscillation at the resonant frequency of the measuring probe or the natural oscillations thereof. Depending on the size of the spring constant of the measuring probe and the ambient conditions in which the measuring probe of the scanning probe microscope operates, the damping of this oscillation may be significantly lower than specified in FIG. 2. FIG. 3 presents a second decay curve of an oscillation excited by the measuring probe lifting away from the sample surface. This figure has been taken from the patent document U.S. Pat. No. 8,650,660 B2.

A further scan process cannot be started for as long as the oscillation of the cantilever has a significant amplitude. A measurement which has a decaying oscillation of the measuring probe overlaid thereon could only be interpreted with great difficulties. The decay time of the oscillation of the measuring probe that is excited when leaving the sample surface therefore restricts the scan rate of a scanning probe microscope.

The U.S. Pat. No. 8,650,660 B2, already mentioned above, describes a peak force tapping (PFT) operating mode for an AFM. Firstly, the PFT operating mode simplifies an automated adjustment of the AFM and, secondly, the PFT operating mode avoids having to wait for the decay of the oscillation of the cantilever, which is excited when the measuring tip lifts off the sample surface, before a new measurement cycle can be started. To this end, the measurement data of a measuring probe are recorded over all interaction cycles with a sample or the surface thereof. An interaction cycle is subdivided into an interaction portion, in which the measuring probe interacts with the sample, and a part without interaction between the sample surface and the measuring probe. The interaction force between the sample and the measuring probe is determined from the interaction portion and the zero point of the deflection of the measuring tip is calculated from the part without interaction.

This patent document requires precise recording of a large amount of data per step-in scan cycle, the automated or manual placement of markers for determining an interaction portion or interaction zone within each step-in scan cycle and a large computational capacity in order to ascertain the interaction between the measuring tip of the measuring probe and the sample surface from the measurement data.

The present invention therefore addresses the problem of specifying an apparatus and a method which can be used at least partly to avoid the problem area, described above, of the step-in scan mode of an SPM or the complexities of previous solutions.

SUMMARY

In accordance with one exemplary embodiment of the present invention, this problem is solved by an apparatus that comprises a scanning probe microscope, the scanning probe microscope having: (a) a scan unit embodied to scan a measuring probe over a sample surface in a step-in scan mode; and (b) a self-oscillation circuit arrangement embodied to excite the measuring probe to a natural oscillation during the step-in scan mode.

As a result of the measuring probe lifting off the sample surface, a very broad frequency spectrum excites the measuring probe and said measuring probe then carries out a relaxation oscillation at its natural or resonant frequency. A self-oscillation circuit arrangement of the scanning probe microscope according to the invention excites the measuring probe to an oscillation precisely at the natural or resonant frequency of the measuring probe during the step-in operating mode. By virtue of the measuring probe being operated at its natural frequency, the decaying oscillation of the measuring probe, which was caused by adhesion forces between the measuring probe and the sample surface, assists the timely set-in of the natural oscillation at a predetermined amplitude of the measuring probe after the measuring tip of the measuring probe has detached from the sample surface. After the measuring probe lifts off the sample surface, it is only necessary to wait until the amplitude of the oscillation induced by the lift reaches the predetermined amplitude of the natural oscillation before a new scan cycle or step-in cycle can be started. This facilitates a significant increase in the scan speed of a scanning probe microscope in the step-in scan mode.

The self-oscillation circuit arrangement may comprise a phase shifter embodied to set a phase of the excitation relative to the natural oscillation of the measuring probe.

So that the oscillation of the measuring probe at its natural frequency can be re-established as quickly as possible after the measuring probe lifts off the sample surface, it is preferable for the excitation or the excitation signal and the natural oscillation of the measuring probe to have a defined phase difference in relation to one another. A best possible excitation of the natural oscillation of the measuring probe is achieved if the excitation signal and the natural oscillation have a phase difference of substantially 90°.

Here and elsewhere in this application, the expression "substantially" denotes an indication of a measurement variable within its error tolerances when the measurement variable is measured using measuring instruments in accordance with the prior art.

The phase shifter may be embodied to set the excitation with a phase difference in relation to the best possible excitation of the natural oscillation of the measuring probe in the range of ±30°, preferably ±20°, more preferably ±10° and most preferably ±5°.

The self-oscillation circuit arrangement may comprise an automatic gain closed-loop control embodied to set an amplitude of the natural oscillation of the measuring probe.

The automatic gain closed-loop control may comprise at least one amplifier, a scan-hold circuit arrangement and a control unit, wherein the control unit is embodied to switch the scan-hold circuit arrangement between the scan mode and the hold mode.

The self-oscillation circuit arrangement may be embodied as a digital circuit. The self-oscillation circuit arrangement may be embodied as a field-programmable gate array (FPGA) or as an application-specific integrated circuit (ASIC).

Further, the scanning probe microscope may have a first actuator embodied to transfer the excitation of the self-oscillation circuit arrangement to a cantilever of the measuring probe and may have a second actuator embodied to transfer a signal from the control unit of the automatic gain closed-loop control to the cantilever of the measuring probe.

The scanning probe microscope may have a first laser system embodied to transfer the excitation of the self-oscillation circuit arrangement to the first actuator and may have a second laser system embodied to transfer the signal from the control unit to the second actuator.

The first actuator and the second actuator may be embodied as a bimorph actuator. The cantilever of the measuring probe may comprise a bimorph actuator.

Further, the scanning probe microscope may have a detector embodied to detect a deflection of the cantilever of the measuring probe and may have a detection unit embodied to detect a vertical position of the free end of the cantilever of the measuring probe.

The detector may comprise a photodetector and/or an interferometer and the detection unit may comprise a photodetector and/or an interferometer. The control unit of the self-oscillation circuit arrangement may be embodied to determine an interaction between the measuring tip of the measuring probe and a sample surface from a measurement of a change in frequency of the natural oscillation of the measuring probe.

Further, the scanning probe microscope may have a control device which comprises the scanning unit and an excitation unit, wherein the excitation unit is embodied to control the self-oscillation circuit arrangement.

The natural oscillation of the measuring probe may comprise a frequency range of 1 kHz to 20 MHz, preferably 5 kHz to 10 MHz, more preferably 10 kHz to 5 MHz and most preferably 20 kHz to 2 MHz. The amplitude of the natural frequency of the measuring probe may comprise a range of 1 nm to 2000 nm, preferably 1 nm to 1000 nm, more preferably 5 nm to 500 nm and most preferably 20 nm to 200 nm.

The self-oscillation circuit arrangement may have a connector embodied to provide a control signal which is used by the self-oscillation circuit arrangement to monitor the amplitude of the natural oscillation of the measuring probe.

According to a further exemplary embodiment of the present invention, the problem is solved by a method for increasing a scan speed of a scanning probe microscope operating in a step-in scan mode, in which the method comprises the following steps: (a) scanning a measuring probe over the sample surface in a step-in scan mode; and (b) exciting the measuring probe to carry out a natural oscillation during the step-in scan mode by way of a self-oscillation circuit arrangement.

Steps (a) and (b) may comprise: (c) in step (b): activating a first actuator embodied to transfer the measuring probe to the measuring probe in the case of the excitation of the self-oscillation circuit arrangement; (d) in step (a): activating a second actuator embodied to change a distance between a measuring tip of the measuring probe and a sample surface; and (e) in step (a): detecting a contact between the measuring tip of the measuring probe and the sample surface.

Steps (a) and (b) may further comprise: (f) in step (b): activating the second actuator; (g) in step (b): deactivating an amplitude closed-loop control by switching a scan-hold circuit arrangement from a scan mode to a hold mode; (h) in step (b): deactivating the first actuator if an amplitude of the natural oscillation drops below a predetermined threshold; (i) in step (a): determining a vertical position of the measuring tip of the measuring probe after detecting a contact of the measuring tip with the sample surface; (j) in step (a): deactivating the second actuator and awaiting a predetermined time duration until there is a loss of contact between the measuring tip of the measuring probe and the sample surface; (k) in step (b): activating the first actuator in phase; and (l) in step (b): activating the amplitude closed-loop control by switching the scan-hold circuit arrangement from the hold mode to the scan mode.

Detecting a contact between the measuring probe and the sample surface may comprise the determination of a vertical position of the measuring tip of the measuring probe at this point.

The method may furthermore comprise the step of: determining a switch-on time for the in-phase activation of the first actuator from a decay curve of the natural oscillation of the measuring probe without activation of the first actuator.

A computer program may comprise instructions which, when executed by a computer system, prompt the computer system to carry out the method steps of the aspects specified above.

BRIEF DESCRIPTION OF DRAWINGS

The following detailed description describes currently preferred exemplary embodiments of the invention, with reference being made to the drawings, in which.

DETAILED DESCRIPTION

Figure 1:
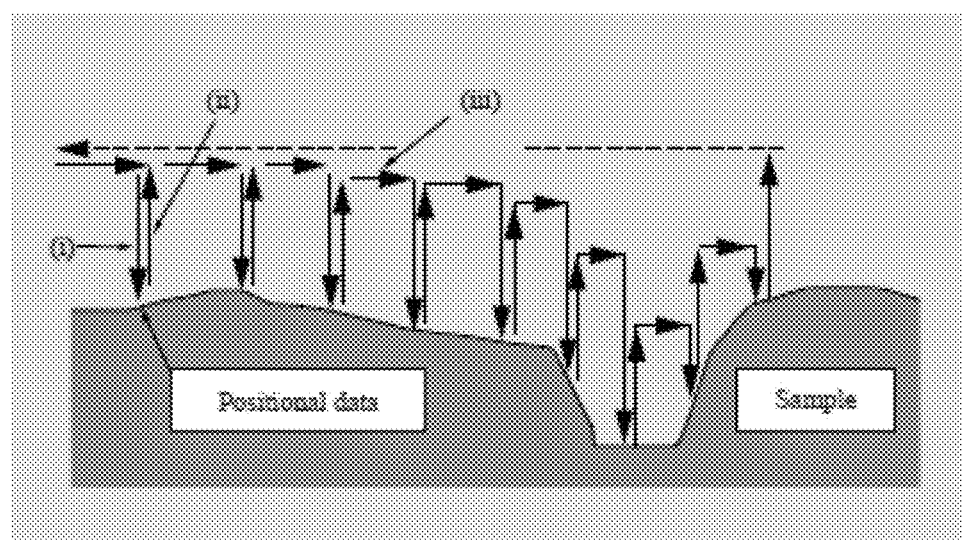
FIG. 1 schematically elucidates a step-in scan mode of a scanning probe microscope according to the prior art.
Figure 3:
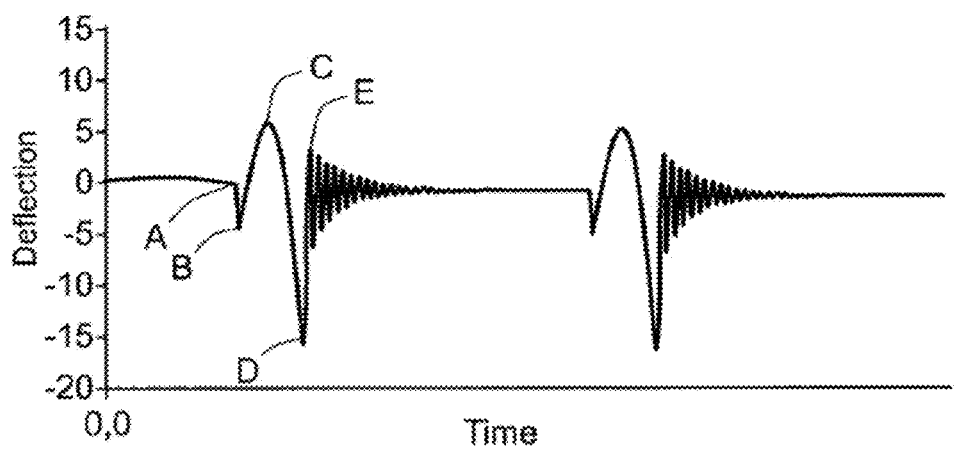
FIG. 3 shows two cycles of a step-in operating mode or of a step-in scan mode of a scanning probe microscope with associated relaxation oscillations according to the prior art, said relaxation oscillations having been induced by the measuring probe lifting off the sample surface.
Figure 2:
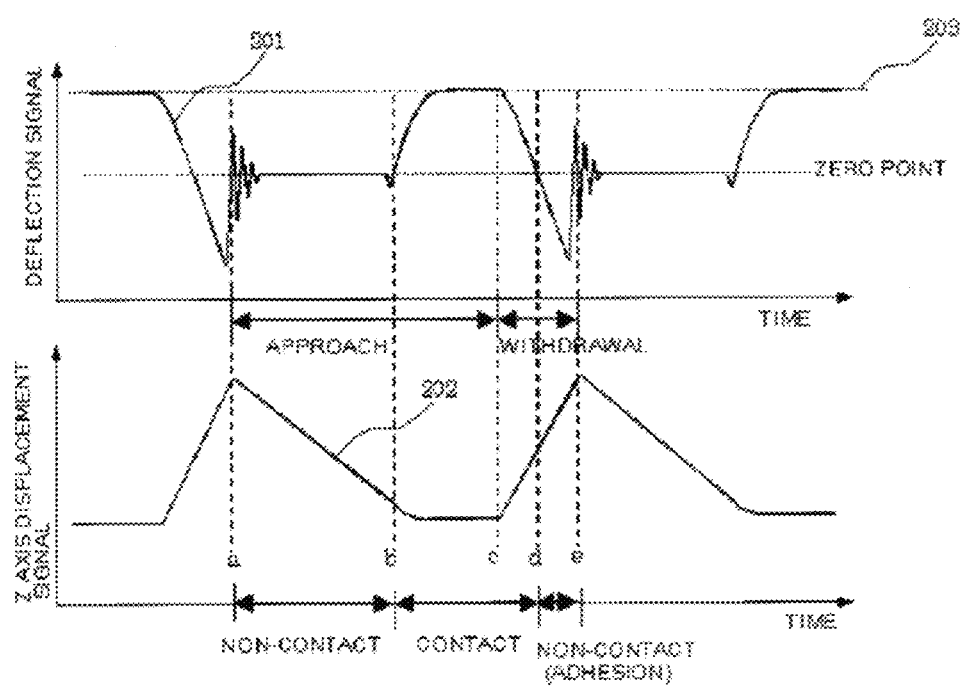
FIG. 2 illustrates the approach of a measuring probe to a sample surface and the deflection signal of a cantilever of the measuring probe in the upper partial image and presents the approach of a measuring tip of the measuring probe to a sample surface, the contact of the measuring tip with the sample surface and the lifting of the measuring tip of the measuring probe off the sample surface in the lower partial image.
Figure 2:
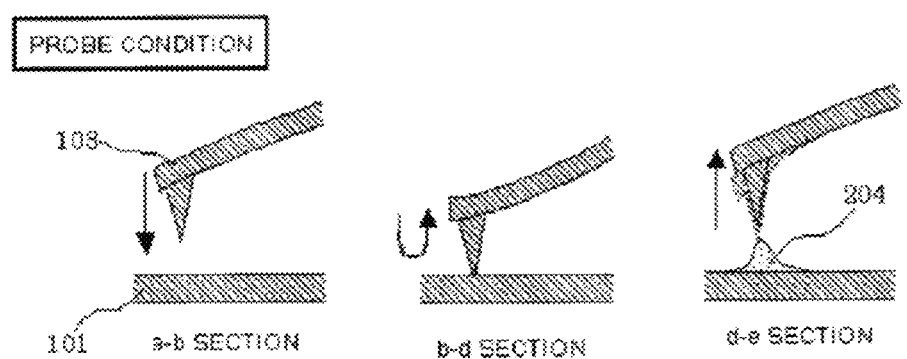

FIGS. 1 to 3 are used to briefly explain the difficulties associated with a scanning probe microscope which operates in a scan operating mode, a scan mode or a step-in scan mode. After that, currently preferred embodiments of an apparatus according to the invention and of a method according to the invention will be explained in greater detail.

The diagram of FIG. 1 schematically shows how measurement data are recorded by a scanning probe microscope operated in a step-in scan mode. In step (i), the measuring probe is placed onto the surface of a sample. In the last phase of the approach between the measuring probe and the sample surface, the measuring tip of the measuring probe falls under the influence of the attractive forces of the sample surface, which are predominantly van der Waals forces, and said measuring tip is attracted by the sample surface. In FIG. 3, this region is specified by letters A and B. At point B, the measuring probe contacts the sample surface. In this state, the distance of the measuring probe in the z-direction or in the vertical direction, i.e. perpendicular to the sample surface, is measured in relation to a reference point or a reference plane.

Then, the measuring probe is withdrawn from the sample surface in step (ii) of FIG. 1. So that the adhesive forces between the measuring tip of the measuring probe and the sample surface can be overcome, the cantilever of the measuring probe has significant stresses before the contact between the measuring tip and the sample surface is broken. The contact between the measuring tip and the sample surface is released at point D in FIG. 3. The energy stored in the cantilever of the measuring probe is dissipated by way of an oscillation of the measuring probe at its resonant frequency with a maximum amplitude E.

In step (iii), the measuring probe is laterally displaced by a predetermined distance in the state where it is withdrawn from the sample surface. A new lowering step (i) can be started as soon as the oscillation that has been induced by lifting the measuring tip of the measuring probe of the sample surface has decayed.

In the upper partial image, FIG. 2 shows, once again, the lowering and withdrawal of a measuring probe from a sample surface and the oscillation of the cantilever of the measuring probe that is caused by releasing the measuring probe from the sample surface. Lowering and withdrawing the measuring probe occurs as a reaction to a control signal applied to the z-actuator of the measuring probe, said control signal being illustrated in FIG. 2 under the curve of the deflection signal of the measuring tip of the measuring probe. The lower partial image in FIG. 2 presents, on the left-hand side, the distance range of the long-range attractive forces of the sample surface, in the center the state in which the measuring tip of the measuring probe is in contact with the sample surface and, on the right-hand side, the moment of detachment of the measuring tip from the sample surface.

The oscillation of the cantilever of the measuring probe caused by lifting the measuring tip off the sample surface depends on a plurality of factors. The form and the material of the measuring tip, and the material composition and the surface condition of the sample influence it. The spring constant of the measuring probe is very important for the maximum size of the amplitude and the decay behavior of the excited resonant oscillation. Finally, the ambient conditions in which the measuring probe operates are of decisive importance for the damping property of the relaxation oscillation of the measuring probe.

Figure 4:
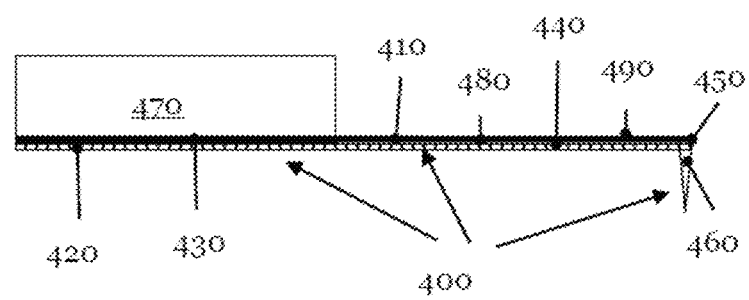
FIG. 4 presents a schematic illustration of a measuring probe with a bimorph actuator.

FIG. 4 schematically shows a section through a measuring probe 400. The measuring probe 400 comprises a bending bar 410 which is referred to as a cantilever 410 below, as is conventional in the art. In the example illustrated in FIG. 4, the cantilever 410 comprises a first layer 420 which, for example, may be manufactured from a semiconductor material such as e.g. silicon. Further, the cantilever 410 has a second layer 430 which, for example, may comprise a metal. The materials for the two-layer cantilever 410 preferably are chosen according to their rigidity or elasticity, their thermal expansion and/or their producibility.

In the example of FIG. 4, the cantilever 410 satisfies the function of a bimorph actuator 440. By activating the bimorph actuator 440, the cantilever 410 of the measuring probe 400 can be excited, firstly, to oscillation at a predetermined frequency and amplitude and, secondly, at a natural frequency of the measuring probe 400. Hence, the bimorph actuator 440 satisfies the function of a first actuator 480. Moreover, the bimorph actuator 440 can be bent downward, i.e. in the direction of the measuring tip 460, by way of an appropriate excitation. The bimorph actuator 440 of the cantilever 410 of the measuring probe 400 accordingly can carry out the function of a second actuator 490.

Attached to the free end 450 of the cantilever 410 is a measuring tip 460. The measuring tip 460 of the measuring probe 400 interacts with a sample surface. The opposite end of the cantilever 410 or the foot of the cantilever 410 is connected to a holding apparatus 470. The holding apparatus 470, which may be embodied e.g. in the form of a holding plate, serves to attach the measuring probe 400 in a scanning probe microscope, for example by way of clamps (not illustrated in FIG. 4).

Figure 5:
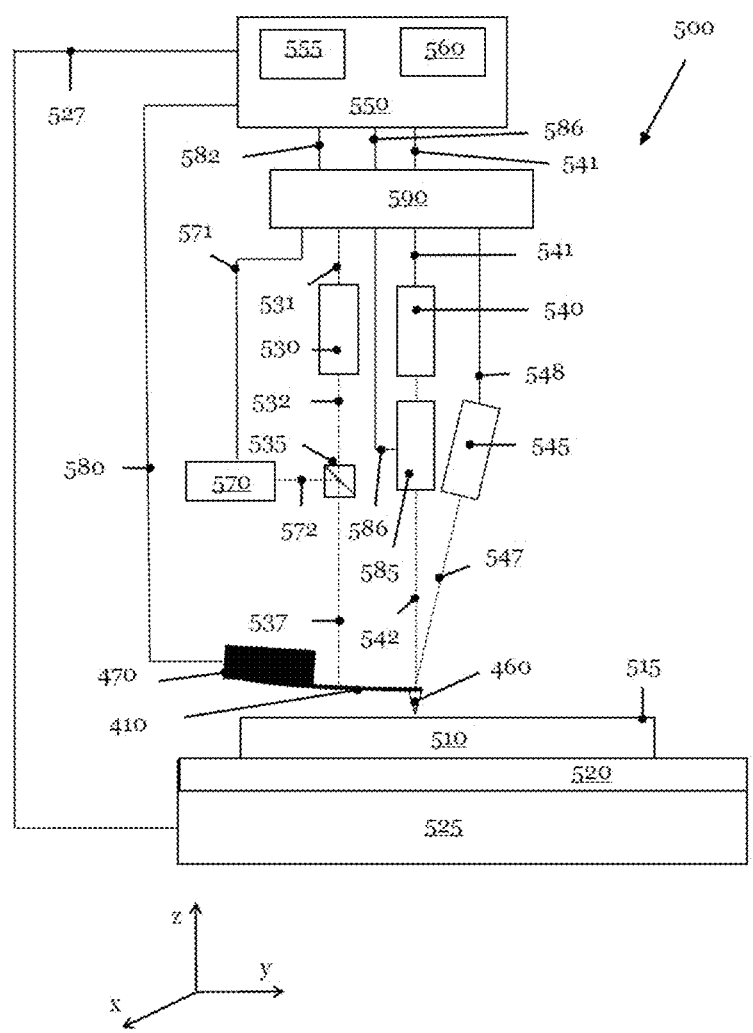
FIG. 5 reproduces some components of a scanning probe microscope in a schematic illustration.

FIG. 5 schematically shows some components of a scanning probe microscope 500, the SPM measuring head of which has a mount (hidden in FIG. 5 for reasons of clarity) serving for incorporating a measuring probe 400 into the SPM 500. Scanning probe microscopes are differentiated according to the measurement variable used for examining the sample 510. Scanning tunneling microscopes (STM) use the tunneling current between the sample 510 and the measuring tip 460, which tunneling current occurs upon a voltage being applied between the sample 510 and the measuring tip 460, in order to analyze the topography of the sample surface 515 of the sample 510. Atomic force microscopes (AFM) determine the surface contour of the sample 510 from the deflection of the measuring tip 460 by the sample 510. Magnetic force microscopes (MFM) measure the magnetic forces between the sample 510 and the measuring tip 460. Scanning near-field optical microscopes (SNOM) use evanescent electromagnetic waves as interaction between the sample 510 and the measuring tip 460. Scanning near-field acoustic microscopes (SNAM) use near-field acoustic interactions for scanning the surface topography of the sample 510. This enumeration of scanning probe microscopes is not complete.

The principle for the excitation of a natural oscillation of the cantilever 410 of the measuring probe 400 for accelerating the scan rate or the scan speed of a scanning probe microscope 500 in a step-in scan mode, as disclosed in this application, can be applied to the measuring probes of all types of scanning probe microscopes which have a cantilever 410, i.e. an elastically flexible lever arm or, for short, a spring beam.

An atomic force microscope (AFM) 500 is explained below as one example of a scanning probe microscope 500. The atomic force microscope 500 illustrated in FIG. 5 can be operated under ambient conditions or in a vacuum chamber (not illustrated in FIG. 5). The sample 510 to be analyzed is arranged on a sample stage 520. The sample stage 520 can be positioned in three spatial directions by a positioning device 525. The positioning device 525 comprises for example one or more micro-displacement elements, for example in the form of spindle actuators and/or piezo-actuators (not shown in FIG. 5).

The measuring probe 400 is secured by use of a mount on a fastening apparatus (not shown in FIG. 4) in the AFM measuring head of the atomic force microscope (AFM) 500. The holding apparatus 470 of the measuring probe 400 can be connected to the measuring head of the AFM 500 via a piezo-actuator (not illustrated in FIG. 5). The piezo-actuator that connects the measuring probe 400 to the AFM measuring head can perform the function of a scanning device. Alternatively, or additionally, in a further embodiment, it is possible to divide the relative movement between the sample surface 515 and the measuring tip 460 of the measuring probe 400 between the positioning device 525 and the piezo-actuator that connects the holding apparatus 470 to the AFM measuring head. By way of example, the positioning device 525 performs the movement of the sample 510 in the sample plane (xy-plane) and the piezo-actuator mentioned above realizes the movement of the measuring tip 460 of the measuring probe 400 in the direction of the normal to the sample (z-direction).

Preferably, however, the sample stage 520 is implemented in a stationary fashion and the measuring tip 460 is brought to the region to be analyzed of the sample 510 by use of micro-displacement elements (not shown in FIG. 5).

The measuring probe 400 can operate in a plurality of operating modes. Firstly, the measuring probe 400 can be scanned at constant height over the surface 515 of the sample 510. Alternatively, the measuring probe 400 can be guided over the sample surface 515 with constant force in a closed control loop. Furthermore, it is possible, with the aid of a modulation method, to cause the cantilever 410 to oscillate perpendicular to the sample surface 515 and thereby to scan the surface 515 of the sample 510 in a closed control loop.

However, the measuring probe 400 is preferably operated in scan mode or a step-in operating mode. In this operating mode, the cantilever 410 of the measuring probe 400 is excited to oscillate at the natural or resonant frequency of the measuring probe 400. In the example illustrated in FIG. 5, use is made of a first laser system 530 in order to excite the cantilever 410 of the measuring probe 400 to oscillate at the natural frequency of the measuring probe 400. The laser system 530 produces a time varying output power which is directed by use of the laser beam 532 onto the bimorph actuator 440 of the measuring probe 400 and which controls the function of the first actuator 480 of the bimorph actuator 440. In the example illustrated in FIG. 5, the first laser system 530 comprises a laser diode which emits light in the infrared range of the electromagnetic spectrum, in particular light in the region of 800 nm. Details of the circuit arrangement that is used to produce the varying output power or the corresponding laser pulses in the laser system 530 are explained below in that the discussion relating to FIGS. 6 and 7.

A second laser system 570 is used to bend the free end 450 of the cantilever 410 in the direction of the sample surface 515. To this end, the beam 572 of the second laser system 570 is unified with the beam 532 of the first laser system 530 to form a common beam 537 of both laser systems 530 and 570 with the aid of the combination element 535 in the example of FIG. 5. The combination element 535 may comprise a polarizing beam splitter cube. The combined beam 537 is preferably directed to the foot of the cantilever 410 of the measuring probe 400. The second laser system 570 emits a light beam 572, the optical power of which is constant in time or only changes slowly over time. In the example of FIG. 5, the second laser system 570 likewise comprises a laser diode which emits in the infrared wavelength range. Hence, the second laser system 570 controls the function of the second actuator 490 of the bimorph actuator 440. The first laser system 530 and the second laser system 570 may have the same emission wavelength or may produce light with different wavelengths. The first laser system 530 and the second laser system 570 can be focused onto the cantilever 410 of the measuring probe 400 by use of a common optical unit which is hidden in FIG. 5 for reasons of simplicity. It is also possible that both laser systems 530 and 570 respectively have a dedicated optical unit and are respectively focused on different points of the cantilever 410.

Further, it is also possible to use a single laser system for carrying out both functions (not illustrated in FIG. 5). In this case, the laser beam of a single laser system supplies the bimorph actuator 440 with energy on time such that the latter, as first actuator 480, excites the cantilever 410 to oscillate at its natural frequency and, as second actuator 490, bends the free end 450 of the cantilever 410 in a defined manner in the direction of the sample surface 515. This configuration is advantageous since, firstly, this reduces the complexity of the scanning probe microscope 500 and of a control device 550 and, secondly, this facilitates working with only one light beam 537, simplifying the adjustment of the SPM 500.

No particular requirements are placed on the laser systems 530 and 570. The wavelength thereof can be chosen as desired. However, wavelengths in the visible range of the electromagnetic spectrum facilitate the adjustment of the laser beam 535 or 575. However, it is expedient to choose the wavelength of the laser radiation in such a way that the portion of absorbed radiation in the bimorph actuator 440 is as large as possible, i.e. to match the materials of the cantilever 410 and the laser system or systems 530 and 570 to one another. An output power of a few mW is sufficient for heating the bimorph actuator 440 or the cantilever 410. Focusing onto a focal spot <10 μm is necessary for heating the cantilever 410 and for exciting natural oscillation of the measuring probe 400. In particular, the focal spot should be smaller than the width of the cantilever 410 in order that only very little laser radiation 537 reaches the sample 510 past the cantilever 410. The resonant frequency of measuring probes 400 lies in the frequency range from several kHz to several MHz. These requirements pose no problem for modern laser systems 530.

The deflection of the measuring tip 460 or the change thereof as a result of the interaction of the measuring tip 460 of the measuring probe 400 with the surface 515 of the sample 510 can be detected using a light pointer system. A light pointer system is illustrated in FIG. 5. As essential components, the light pointer system comprises a third laser system 540 and the detector 545. The third laser system 540 radiates through a detection unit 585 and directs the laser beam 542 onto the free end 450 of the cantilever 410. The laser beam 547 reflected from the cantilever 410 is picked up by a detector 545. In the example illustrated in FIG. 5, the third laser system 540 comprises a solid-state laser which emits light in the visible range of the electromagnetic spectrum, in particular green light. The third laser system 540 is controlled by the control device 550 via the connection 541. The detector 545 of the light pointer system is often embodied in the form of a four quadrant photodiode. It is also possible to use a two segment photodiode (not illustrated in FIGS. 5 and 6). The detector 545 can detect both the oscillation of the cantilever 410 at the natural frequency of the measuring probe 400 and the adjustable bending of the free end 440 of the cantilever 410 by the second actuator 490 for lowering the measuring tip 460 onto the sample surface 515.

A detection unit 585 is installed into the scanning probe microscope 500 of FIG. 5. By way of example, the detection unit 585 may comprise an optical interferometer, for example a laser interferometer and/or a photodiode. In the example illustrated in FIG. 5, the detection unit 585 comprises an interferometer, the light source of which is formed by the third laser system 540. In the example illustrated in FIG. 5, the detection unit 585 is used to measure the z-position of the vertical position of the measuring tip 460 of the measuring probe 400 when the measuring tip 460 contacts the surface 515 of the sample 510. To this end, the interferometer 585 analyzes the light of the light beam 542 of the third laser system 540 that has been reflected by the free end 450 of the cantilever when the measuring tip 460 is in contact with the sample surface 515. Further, it is possible to use the detection unit 585 in order to ascertain the movement of the measuring tip 460 in the z-direction, i.e. perpendicular to the sample surface 515.

In addition, a deflection of the free end 450 of the cantilever 410 can be detected, additionally or alternatively, with the aid of piezoresistive elements or sensors of the cantilever 410 (not illustrated in FIG. 5). Furthermore, it is also possible to determine the distance of the free end 450 of the cantilever 410 in relation to the sample surface 515 and a reference point or a reference plane from a combination of optical signals of the light pointer system and/or the detection unit 585 and the measurement data of piezoresistive elements (likewise not shown in FIG. 5).

Furthermore, the atomic force microscope 500 comprises a control device 550. The control device 550 comprises a scan unit 555 and an excitation unit 560.

The control device 550, the scan unit 555 and the excitation unit 560 can be embodied as hardware, software, firmware or a combination thereof.

Via the connections 527 and 580, the scanning unit 555 provides open-loop and/or closed-loop control of the movement of the positioning unit 525 and/or of the piezo-actuator which connects the measuring probe 400 with the AFM measuring head. Further, the scan unit 555 of the control device 550 controls the third laser system 540 via the connection 541. Via the connection 582, the excitation unit 560 controls a self-oscillation circuit arrangement 590 which produces the excitation or excitation signal with which the measuring probe 400 is excited to a natural oscillation.

The self-oscillation circuit arrangement 590 receives measurement data from the detector 545 via the connection 548. Further, the self-oscillation circuit arrangement 590 likewise may obtain measurement data from the detection unit 585 via the connection 586. The detection unit 585 supplies its measurement data to the scan unit 555 of the control device 550 via the connection 586. The self-oscillation circuit arrangement 590 controls the first laser system 530 via the connection 531, said first laser system, in turn, controlling the first actuator 480 of the bimorph actuator 440 by the laser beam 532. Moreover, the self-oscillation circuit arrangement 590 controls the second laser system 570 via the connection 571. As already explained above, the laser beam 572 of the second laser system 570 controls the second actuator 490 of the bimorph actuator 440 and hence the bending of the measuring tip 460 of the cantilever 410 of the measuring probe 400 in the direction of the sample surface 515. To this end, the combined laser beam 537—as likewise already explained above—is directed onto the cantilever 410 of the measuring probe 400 in the vicinity of the foot of the cantilever 410 (i.e. of the end of the cantilever 410 on which the holding apparatus 470 is attached).

In an alternative embodiment, the bimorph actuator 440 is heated with the aid of one or more resistor elements instead of by the laser system 570. By way of example, a first resistor element can be used instead of the first laser system 530 and a second resistor element can be used instead of the second laser system 570 (not shown in FIG. 5). In another embodiment, the measuring probe 410 is excited to oscillate at its natural frequency with the aid of a piezoelectric element (not shown in FIG. 5). It is likewise possible to use mixed forms of the above-described embodiments.

The interaction between the measuring tip 460 and the sample surface 515 can be detected by a change in the amplitude of the measuring probe 400 that has been excited to oscillate. Alternatively, it is possible to ascertain the interaction between the measuring tip 460 and the sample surface 515 from a change in the frequency of the natural oscillation when the measuring tip 460 approaches the sample surface 515.

Figure 6:
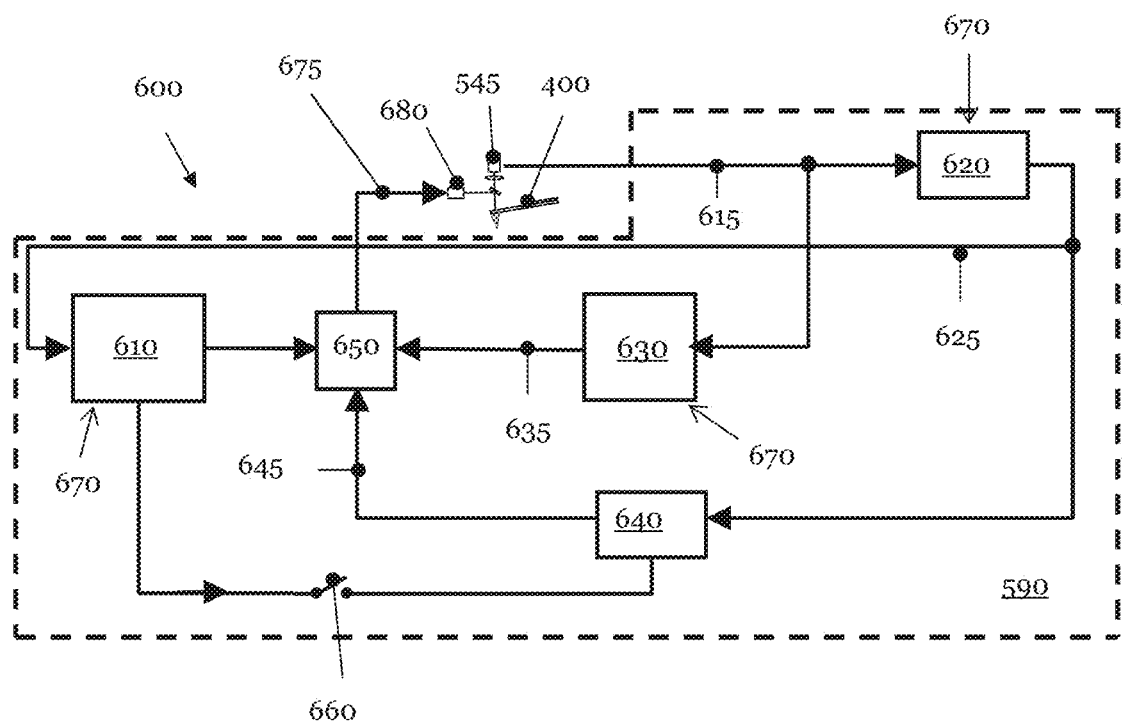
FIG. 6 reproduces some components of a self-oscillation circuit arrangement.

The diagram 600 in FIG. 6 shows essential components of the self-oscillation circuit arrangement 590 of FIG. 5, which can be used for producing an excitation or an excitation signal for generating a natural oscillation of the measuring probe 400. In the example illustrated in FIG. 6, the first laser system 530 and the second laser system 570 are combined in the laser system 680. The control unit 610 of the self-oscillation circuit arrangement 590 is connected to the excitation unit 560 of the control device 550 of the SPM 500 (not shown in FIG. 6). The self-oscillation circuit arrangement 590 has an automatic gain closed-loop control 670 in the form of an amplifier 620, of a scan-hold circuit arrangement 640 and of the control unit 610. Further, the self-oscillation circuit arrangement 590 comprises a switch 660, by use of which the control unit 610 can switch between a scan mode and a hold mode of the scan-hold circuit arrangement 640. A phase shifter 630 adapts the phase angle of the excitation provided for the laser system 680 or the control signal provided for the laser system 680 to the phase of the natural oscillation of the measuring probe 400. Further, the automatic gain closed-loop control 670 has a combination unit 650 which combines the signals of the phase shifter 630, of the scan-hold circuit arrangement 640 and of the control unit 610. By way of example, the combination unit 650 may have a multiplication unit (not shown in FIG. 6) which multiplies the signals of the phase shifter 630 and of the scan-hold circuit arrangement 640. Further, the combination unit 650 may comprise a summation unit (not illustrated in FIG. 6) which adds the multiplied signal of the phase shifter 630 and of the scan-hold circuit arrangement 640 to the signals of the control unit 610.

Further, the control unit 610 comprises a generator part for producing a voltage ramp. A generator part produces a voltage signal which is part of the excitation signal 675 for the laser system 680. The voltage ramp of the generator part of the control unit 610 controls the second actuator 490 of the cantilever 410 via the laser system 680 and hence controls the distance of the measuring tip 460 of the measuring probe 400 from the sample surface 515.

By virtue of the self-oscillation circuit arrangement 590 multiplying part of the measurement signal 615 of the detector 545 in phase with the amplified measurement signal 625, the combination unit 650 produces an excitation 675 or an excitation signal 675, which has positive feedback, for natural oscillation of the measuring probe 400. For the purposes of an ideal excitation 675 of the natural oscillation of the measuring probe 400, the excitation 675 has a phase difference of 90° in respect of the phase of the natural oscillation of the measuring probe 400. The phase of the excitation signal 675 precedes the phase of the natural oscillation of the measuring probe by $\pi/2$. A deviation from the best possible phase difference of $\pi/2$ into the range of ±30° is admissible, without drastically restricting the working range of the phase closed-loop control of the natural oscillation of the measuring probe.

The automatic gain closed-loop control 670 regulates the amplitude of the excitation signal 675 to a predetermined value, i.e. the gain of the excitation is set in such a way that the losses of the natural oscillation of the measuring probe 400 during an oscillation period are just compensated. While the measuring tip 460 of the cantilever 410 approaches the sample surface 515, the control unit 610 actuates the switch 660 and switches the scan-hold circuit arrangement 640 from the scan mode, in which the amplitude of the natural oscillation of the measuring probe 400 is regulated, into the hold mode, in which the amplitude of the natural oscillation is no longer regulated but instead excited by a fixed excitation signal 675. The switch-over from regulating the amplitude to a fixed excitation prevents the amplitude closed-loop control of the natural oscillation from damaging a sensitive sample or the measuring probe 400 during an interaction between the measuring tip 460 and the sample surface 515 and, at the latest, upon contact between the measuring tip and the sample surface 515 by virtue of the closed-loop control attempting to maintain a predetermined oscillation amplitude of the natural oscillation of the measuring probe 400.

After contact between the measuring tip 460 of the measuring probe 400 and the sample surface 515 has been detected, the control unit 610 switches off the first laser system 530. In the combined laser system 680 illustrated in FIG. 6, the sinusoidal excitation of the first actuator 480 is interrupted while the laser system 680 continues to activate the second actuator 490 of the cantilever 410 with the direct light component of its output power (not shown in FIG. 6). The control unit 610 determines contact between the measuring tip 460 and the sample surface 515 from a reduction in the amplitude of the natural oscillation of the measuring probe 400 to below a predetermined threshold. To this end, the control unit 610 continuously evaluates the signal from the detector 545. Immediately after the detection of the contact between the measuring tip 460 of the measuring probe 400 and the sample surface 515, the scan unit 555 ascertains the vertical position of the measuring tip 460 of the measuring probe 400 from the measurement data of the detection unit 585. Thereupon, the control unit 610 of the self-oscillation circuit arrangement 590 switches off the second laser system 570. The laser system 680 is switched off in the example illustrated in FIG. 6.

After awaiting a predetermined period of time which ensures that the measuring tip 460 has lost contact with the sample surface 515, the control unit 610 switches the first laser system 530 on again or actuates the laser system 680 with the excitation signal 675. The scan-hold circuit arrangement 640 is switched, parallel therewith, from the hold mode to the scan mode by actuating the switch 660. As a result, the amplitude closed-loop control of the natural oscillation of the measuring probe 400 is reactivated. At the same time, the phase control loop between the excitation signal 675 and the natural oscillation of the measuring probe 400 is closed again by switching on the first laser system 530.

When the first laser system 530 is switched on again when the laser system 680 is activated by the excitation signal 675, the time of switching on-again is selected in such a way that the phase difference between the excitation signal 675 and the natural oscillation of the measuring probe 400, which is initiated by the measuring tip 460 lifting off the sample surface 515, fit to one another to the best possible extent.

There are a number of options for determining this time. Firstly, a fixed time interval is awaited between the switch-off time of the second laser system 570 and switching the first laser system 530 back on again (or between switching off the laser system 680 and activating it by the excitation signal 675). Since timings within the various step-in measurement cycles are very similar, the time at which the switching on is effectuated again can be ascertained empirically.

Secondly, it is possible to measure the entire curve of the deflection of the measuring tip 460 during a step-in cycle once and the point D or E in FIG. 3 is ascertained. As a result, the time interval between points B (switching off the first laser system 530) and D (the measuring tip 460 lifting away from the sample surface 515) is known. By way of example, then it is still possible to await one or more periods of the relaxation oscillation of the measuring probe 400 before the first laser system 530 is switched on again. Moreover, it is possible to measure only the relaxation oscillation of the measuring probe 400, which is initiated by the lift off of the measuring tip 460 from the sample surface, and calculate the switch on time for the first laser system 530 or for the laser system 680 from these measurement data.

In a further alternative, the first laser system 530 need not be switched off during the contact between the measuring tip 460 and the sample surface 515. However, depending on the rigidity or the spring constant of the measuring probe 400, this procedure harbors the risk of overdriving the electronics of the self-oscillation circuit arrangement 590.

The self-oscillation circuit arrangement 590 can be embodied in analog or digital form. Further, the self-oscillation circuit arrangement 590 can be realized as hardware, software, firmware or a combination thereof.

Figure 7:
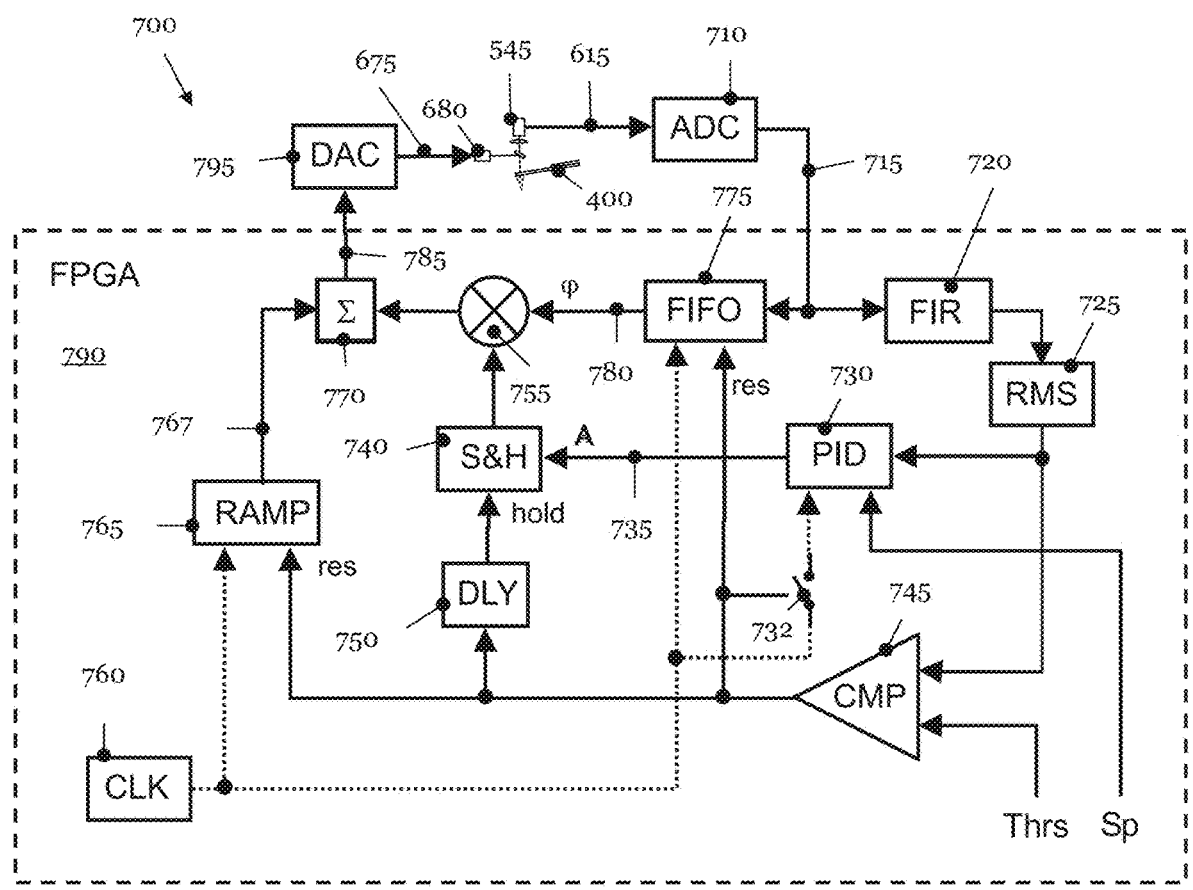
FIG. 7 shows some components of a self-oscillation circuit arrangement embodied in the form of an FPGA.

The diagram 700 in FIG. 7 shows an exemplary embodiment of a self-oscillation circuit arrangement 790 which is embodied as a digital circuit arrangement in the form of an FPGA (field programmable gate array). An analog-to-digital converter 710 (ADC) receives measurement signals 615 from the detector 545 in analog form and converts these into digital signals 715. The digital signals 715 are supplied to an FIR (finite impulse response) filter 720 of the self-oscillation circuit arrangement 790. The filter 720 removes the slow ramp component of the measurement signal 615, which arises from lowering the measuring tip 460 of the measuring probe 400 onto the sample surface 515 and which is superposed on the natural oscillation of the measuring probe 400. The filtered digital data are supplied to a second RMS (root mean square) filter 725, which determines effective value of the amplitude of the natural oscillation of the measuring probe 400. The filter 725 averages over a plurality of periods of the natural oscillation of the measuring probe 400. The output of the RMS filter 725 is fed to a PID (proportional integral differential) controller 730. The controller 730 represents the feedback element for the amplitude closed-loop control. With the aid of the switch 732, the clock signal of the clock generator 760 is not applied to the PID controller 730 during the period of time in which the amplitude closed-loop control is inactive. The output signal 735 of the PID controller 730 contains the amplitude component A of the digital excitation signal 785 and is applied to an input of the scan-hold circuit arrangement S&H 740.

A second part of the output signal of the RMS filter 725 is applied to an input of the comparator CMP 745. The comparator 745 compares this signal to a threshold Thrs that is applied to a second input. If the amplitude of the natural oscillation of the measuring probe 400 falls under a predetermined threshold, the output of the comparator 745 is active, i.e. said comparator realizes the function A<B. The comparator 745 provides its output signal to the FIFO (first in-first out) memory 775 and to the scan-hold circuit arrangement 740 via the delay member DLY 750 and, secondly, to the ramp generator RAMP 765.

By way of example, the ramp generator 765 can be embodied in the form of a counter. The delay member 750 realizes a wait before taking up the amplitude closed-loop control of the natural oscillation of the measuring probe 400 again. After the measuring tip 460 lifts off the sample surface 515, the filters 720 and 725 require some time to recover. Therefore, the delay member 750 delays the switch-on of the amplitude closed-loop control of the natural oscillation of the measuring probe 400 by a few periods of the relaxation oscillation. In the example illustrated in FIG. 7, a fixed wait is implemented in the form of a 1-bit signal.

A second part of the digitized input signal 715 is supplied to the FIFO memory 775 of the self-oscillation circuit arrangement 790. The memory 775 realizes the function of the phase shifter. The delay of the FIFO memory 775 is determined by the quotient of the memory depth (e.g. 10 memory cells) and the clock frequency of the self-oscillation circuit arrangement 790. The output signal 780 of the FIFO memory 775 represents the phase component φ of the digital excitation signal 785 and said output signal is supplied to the multiplication unit 755.

The clock rate produced by the clock generator CLK 760 is provided to the ramp generator 765, to the FIFO memory 775 and, during the period of time in which the amplitude closed-loop control is activated, to the PID controller 730. The setpoint value of the oscillation amplitude of the natural oscillation of the cantilever 410 is set at the PID controller 730 with the aid of the signal Sp (setpoint).

The ramp generator 765 produces the signal 767 for bending the cantilever 410 toward the sample surface by activating the second actuator 490 of the cantilever 410. The counter of the ramp generator 765 is stopped by the comparator 745 by use of the reset signal res and the voltage ramp 767 at the output of the comparator 745 is reset to the initial value. As a result, the laser system 680 is switched off and the measuring tip 460 of the measuring probe 400 is withdrawn from the sample surface 515.

The multiplication unit 755 multiplies the signals of the outputs of the memory 775, i.e. the phase component φ, and the scan-hold circuit arrangement 740, i.e. the amplitude component A of the excitation signal of the natural oscillation of the measuring probe 400. The summation element Σ 770 adds the output signals 767 of the ramp generator 765 and of the multiplication unit 755.

The output signal 785 of the self-oscillation circuit arrangement 790 is converted into an analog excitation signal 665 by the digital-to-analog converter DAC 795, said analog excitation signal being supplied to the laser system 680. If, as illustrated in FIG. 5, use is made of a first laser system 530 for exciting the natural oscillations of the measuring probe 400 and of a second laser system 570 for bending the cantilever 410, the output signal of the multiplication unit 755 is supplied to the first laser system 530 after a digital-to-analog conversion. The output signal 767 of the ramp generator 765 controls the second laser system 570 after an appropriate digital-to-analog conversion. In this embodiment, the self-oscillation circuit arrangement 790 does not require the summation element 770.

Figure 8:
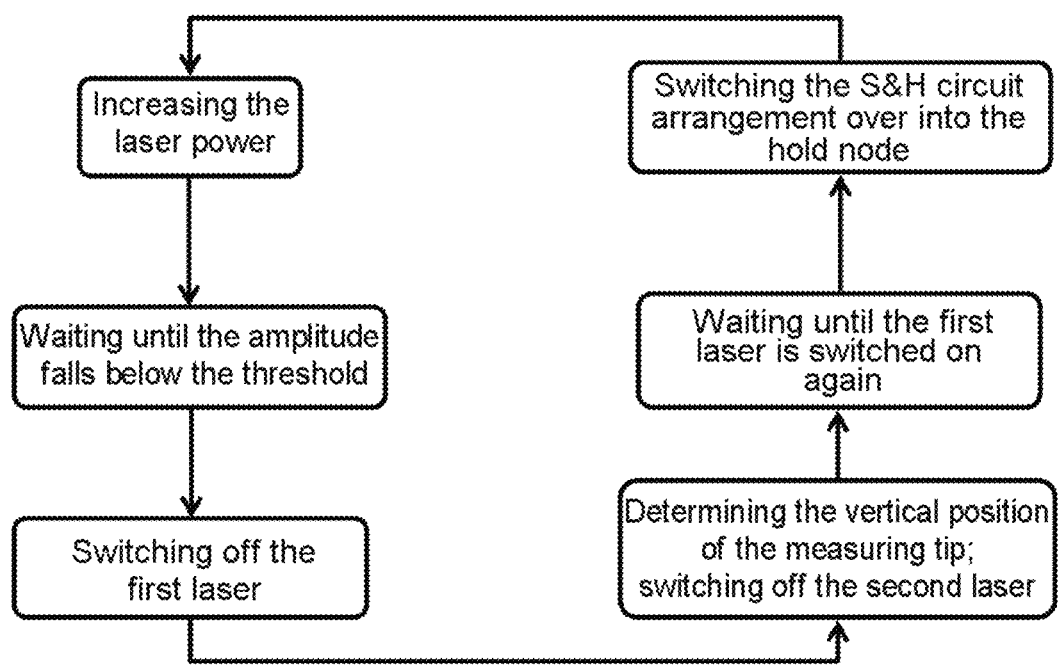
FIG. 8 represents a schematic of a cycle of the step-in scan mode.

FIG. 8 presents a cycle of a scan mode or a step-in scan mode of the scanning probe microscope 500. The explanation of the schematic starts top left. In the initial state, the measuring probe 400 is excited to oscillate at its natural frequency. In this state, the first laser system 530 in FIG. 5 is switched on and activates the first actuator 480 of the cantilever 410 of the measuring probe 400. In the first step, the continuous wave output power of a laser system, for example of the laser system 680, is increased or the second laser system 570 is switched on in order to lower the measuring tip 460 of the measuring probe 400 onto the sample surface 515 by bending the cantilever 410, caused by the second actuator 490 of the cantilever 410.

In the next block or step, there is a wait until the amplitude of the natural oscillation of the measuring probe 400 falls under a predetermined threshold. As explained in the context of FIG. 7, this is achieved by continuously measuring the amplitude of the natural oscillation of the measuring probe 400 with the aid of the detector 545 and by the comparison with a predetermined threshold.

If the measuring tip 460 of the measuring probe 400 is in contact with the sample surface 515, the excitation of the natural oscillation of the measuring probe 400 is terminated in the third block by switching off the first laser system 530. The sinusoidal excitation signal is stopped in the laser system 680 of FIGS. 6 and 7.

In the next step, the vertical position of the measuring tip 460 is measured in the fourth block with the aid of the third laser system 540 and the detection unit 585. The vertical position of the measuring tip 460 is measured by way of the second detection unit 585 immediately after the measurement signal of the detector 545 facilitates the determination of the contact between the measuring tip 460 and the sample surface 515. As a result, the time interval for a step-in measurement cycle can be kept short. After determining the position of the measuring tip 460, the bending of the cantilever 410 by the second actuator 490 is stopped by switching off the second laser system 570. The laser system 680 is switched off in FIGS. 6 and 7.

Then, there is a wait in the fifth step or block until the measuring tip 460 lifts off the sample 510. In the context of the discussion of FIG. 6, three alternative methods are specified, on the basis of which it is possible to determine the time at which this occurs or how the time at which the first laser system 530 is switched on again can be ascertained or how the time at which a sinusoidal excitation signal is applied to the laser system 680 can be ascertained. Under control of the excitation unit 560, the self-oscillation circuit arrangement 590, 790 produces an excitation 675 or excitation signal 675 at the resonant frequency of the measuring probe 400 and overlays this in phase on the oscillation of the measuring probe 400 that is produced by the lift-off of the measuring tip 460. To this end, the laser system 530 or 680 activates the first actuator 480 of the cantilever 410.

Thereupon, the scan-hold circuit arrangement 640, 740 is switched from the scan mode into the hold mode in the sixth step. As already explained above, this prevents the amplitude closed-loop control of the natural oscillation of the measuring probe 400 from damaging the sample 520, the cantilever 410 and/or the measuring tip 460 of the measuring probe 400 when the measuring tip 460 approaches the sample surface 515. Then, the SPM 500 is prepared for a further scan cycle.

Figure 9:
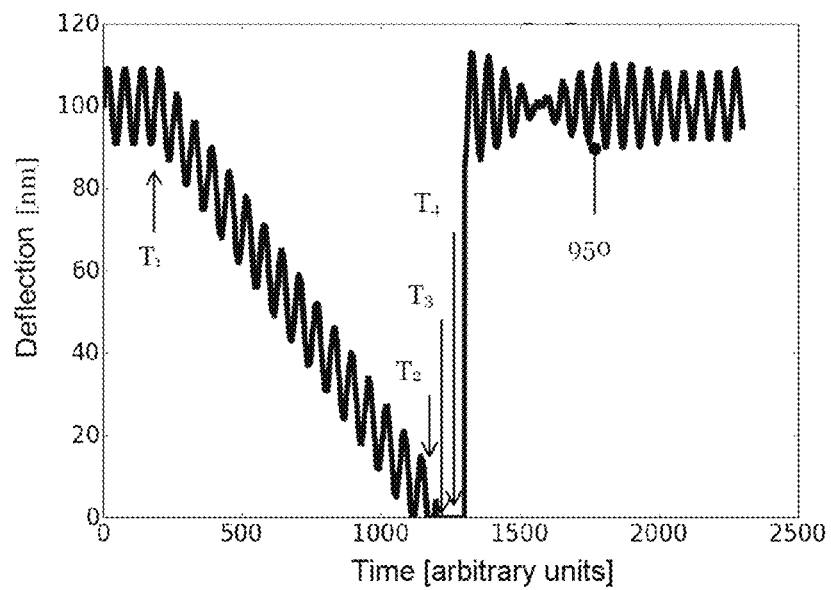
FIG. 9 presents a cycle of a step-in scan mode, in which the excitation frequency of the measuring probe does not correspond to the resonant frequency of the measuring probe.

As already explained above, FIGS. 2 and 3 show the excitation of an oscillation of the cantilever 410 of the measuring probe 400 at its resonant frequency by virtue of the measuring tip 460 of the cantilever 410 lifting off the sample surface 515. FIG. 9 presents an example of an oscillation excitation of the cantilever 410 when the measuring tip 460 lifts off the sample surface 515. Like in FIG. 3, the oscillation of the cantilever 410 that is excited by the measuring tip 460 lifting off the sample surface 515 only has weak damping. By way of example, this may occur if the spring constant of the cantilever 410 is small and the measuring probe 400 is operated in a vacuum environment, i.e. the ambient pressure experienced by the measuring probe 400 lies in the region of one Pascal or is significantly lower.

Figure 10:
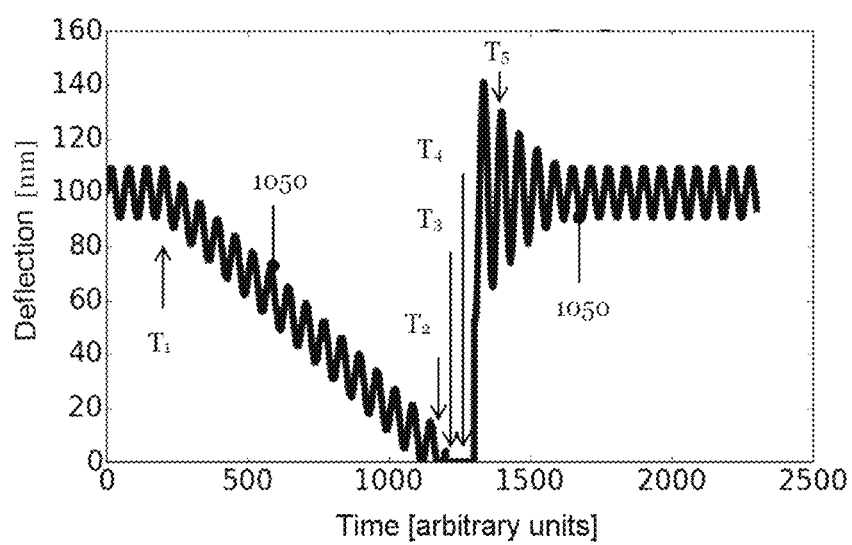
FIG. 10 presents a cycle of a step-in scan mode, in which the excitation frequency of the measuring probe corresponds to its resonant frequency.

In the FIGS. 9 and 10, the time is plotted in arbitrary units along the abscissa. The ordinate of both figures shows the distance of the measuring tip 460 from the sample surface 515 in nanometers. In the initial situation, the measuring tip 460 has a mean distance of 100 nm from the sample surface 515. The cantilever 410 of the measuring probe 400 oscillate at an amplitude of approximately 10 nm. The second laser system 570 is switched on at the time $T_1$ and the second actuator 490 of the cantilever 410 reduces the mean distance between the measuring tip 460 and the sample surface 515. At the time $T_2$, the control unit 610 detects that the amplitude of the oscillation of the measuring probe 400 has fallen under a predetermined threshold and switches off the first laser system 530. The vertical position of the measuring tip 460 is measured at the time $T_3$. The control unit 610 switches off the second laser system 570 at the time $T_4$.

In FIG. 9, the excitation frequency of the cantilever 410 during the lowering of the measuring tip 460 of the measuring probe 400 onto the sample surface 515 lies close to the resonant frequency of the cantilever 410, but it is not identical therewith. After the measuring tip 460 detaches from the sample surface 515, the cantilever 410 exhibits a beat 950, which is caused by the superposition of an excitation whose frequency differs from the natural frequency and an excitation at the natural frequency of the measuring probe 400, which was induced by the measuring tip 460 lifting off the sample surface. This beat 950, which continues until the natural oscillation of the measuring probe 400 has substantially decayed, prevents a new step-in cycle from being started prior to this time. Consequently, the scan rate of the step-in scan mode is low, resulting in long examination times for the sample surface 515.

FIG. 10 presents the configuration of FIG. 9, with the difference that the excitation 675 of the measuring probe 400 is effectuated exactly at its resonant or natural frequency. In this case, the natural oscillation 1150 of the measuring probe 400 that is excited by the measuring tip 460 lifting off the sample surface 515 helps to restore as quickly as possible the natural oscillation 1050 that is present when lowering the measuring tip 460 onto the sample surface 515. It is only necessary to wait until the amplitude of the natural oscillation 1050 of the measuring probe 400 has dropped to the level seen when the measuring tip 460 approached the sample surface 515.

The beat 950 in FIG. 9 is directly included in the measurement error when determining the vertical position of the measuring tip 460. It is therefore necessary to wait until the amplitude of the natural vibration has decayed to below a tolerable measurement error before the next step-in measurement cycle. The tolerable measurement error is typically significantly less than 1 nm. In the case of the self-oscillation illustrated in FIG. 10, it is only necessary to wait until the amplitude of the natural oscillation reaches the setpoint value of the amplitude of the natural oscillation 1050. These differences should be illustrated using a simple example.

By way of example, the measurement probe 400 has a quality factor of Q=1000. The maximum amplitude of the natural oscillation 1050 is 300 nm. In the case of the beat 950 explained in FIG. 9, it is necessary for the amplitude of the natural oscillation to have decayed to 0.5 nm before a new step-in measurement cycle can be started. The amplitude of the natural oscillation 1050 illustrated in FIG. 10 is 50 nm. Without excitation, the amplitude of the natural oscillation of the measuring probe 400 decreases exponentially. For the amplitude of the natural oscillation to drop to 50 nm, a duration of approximately 150 oscillation periods is required, whereas a drop in amplitude to 0.5 nm requires a duration of approximately 500 oscillation periods. As a consequence, the time duration of a step-in measurement cycle can be reduced by approximately a factor of three by virtue of exciting the measuring probe 400 at its natural frequency.

Figure 11:
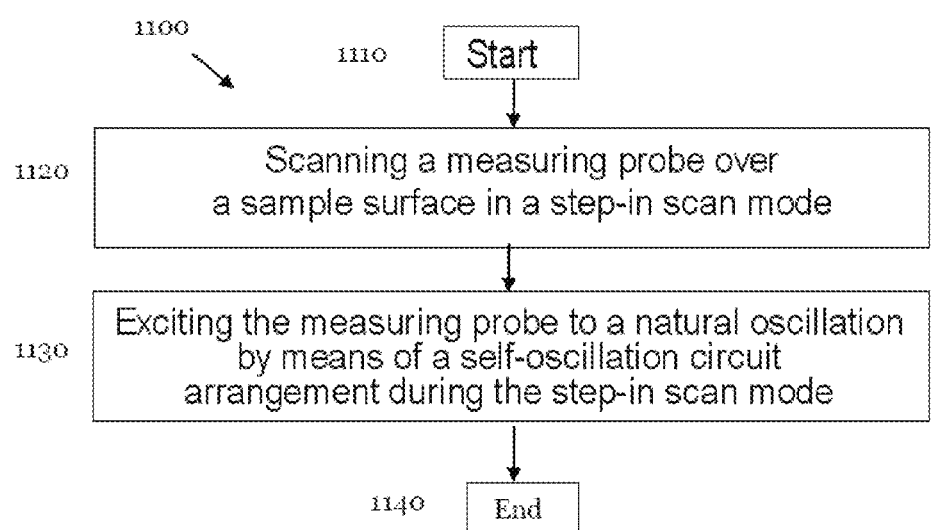
FIG. 11 presents a flowchart of a method for increasing the scan speed of a scanning probe microscope operating in the step-in scan mode

Finally, FIG. 11 reproduces a flowchart 1100 of a method which can be used for increasing the scan speed of a scanning probe microscope 500 during the step-in scan mode. The method begins at 1110. At step 1120, a measuring probe 400 is scanned over a sample surface 515 in a step-in scan mode. At step 1130, the measuring probe 400 is excited to a natural oscillation by use of the self-oscillation circuit arrangement during the step-in scan mode. The method ends at step 1140.

What is claimed is:

1. A scanning probe microscope comprising:
   a. a scan unit embodied to scan a measuring probe over a sample surface in a step-in scan mode; and
   b. a self-oscillation circuit arrangement configured to excite the measuring probe to a natural oscillation during the step-in scan mode;
   c. wherein the self-oscillation circuit arrangement comprises a phase shifter configured to set a phase of the excitation relative to the natural oscillation of the measuring probe, wherein the phase shifter is configured to set the excitation with a phase difference in relation to a best possible excitation of the natural oscillation of the measuring probe in a range of ±30°; and
   wherein the self-oscillation circuit arrangement comprises an automatic gain closed-loop control configured to set an amplitude of the natural oscillation of the measuring probe.

2. The scanning probe microscope according to claim 1, wherein the phase shifter is configured to set the excitation with a phase difference in relation to the best possible excitation of the natural oscillation of the measuring probe in the range of ±20°.

3. The scanning probe microscope according to claim 1, wherein the automatic gain closed-loop control comprises at least one amplifier, a scan-hold circuit arrangement and a control unit, wherein the control unit is configured to switch the scan-hold circuit arrangement between a scan mode and a hold mode.

4. The scanning probe microscope according to claim 1, wherein the self-oscillation circuit arrangement is embodied as a digital circuit.

5. The scanning probe microscope according to claim 1, wherein the self-oscillation circuit arrangement is embodied as at least one of a field-programmable gate array (FPGA) or an application-specific integrated circuit (ASIC).

6. The scanning probe microscope according to claim 3, further having a first actuator configured to transfer the excitation of the self-oscillation circuit arrangement to a cantilever of the measuring probe and a second actuator configured to transfer a signal from the control unit of the automatic gain closed-loop control to the cantilever of the measuring probe.

7. The scanning probe microscope according to claim 6, further having a first laser system configured to transfer the excitation of the self-oscillation circuit arrangement to the first actuator and a second laser system configured to transfer the signal from the control unit to the second actuator.

8. The scanning probe microscope according to claim 6, wherein the first actuator and the second actuator are embodied as a bimorph actuator.

9. The scanning probe microscope according to claim 8, wherein the cantilever of the measuring probe comprises the bimorph actuator.

10. The scanning probe microscope according to claim 6, further having a detector configured to detect a deflection of the cantilever of the measuring probe and a detection unit configured to detect a vertical position of a free end of the cantilever of the measuring probe.

11. The scanning probe microscope according to claim 1, further having a control device which comprises the scan unit and an excitation unit, wherein the excitation unit is configured to control the self-oscillation circuit arrangement.

12. The scanning probe microscope according to claim 1, wherein the amplitude of the natural oscillation of the measuring probe comprises a range of 1 nm to 1000 nm.

13. A method for increasing a scan speed of a scanning probe microscope operating in a step-in scan mode, the method comprising the following steps:
  a. scanning a measuring probe over a sample surface in a step-in scan mode;
  b. exciting the measuring probe to carry out a natural oscillation during the step-in scan mode by way of a self-oscillation circuit arrangement; and
  c. setting a phase of the excitation relative to the natural oscillation of the measuring probe by use of a phase shifter of the self-oscillation circuit arrangement, wherein the phase shifter is configured to set the excitation with a phase difference in relation to a best possible excitation of the natural oscillation of the measuring probe in a range of ±30°; and
  wherein the self-oscillation circuit arrangement comprises an automatic gain closed-loop control configured to set an amplitude of the natural oscillation of the measuring probe.

14. The method according to claim 13, wherein steps a. and b. comprise:
  d. in step b.: activating a first actuator configured to transfer the excitation of the self-oscillation circuit arrangement to the measuring probe;
  e. in step a.: activating a second actuator configured to change a distance between a measuring tip of the measuring probe and a sample surface; and
  f. in step a.: detecting a contact between the measuring tip of the measuring probe and the sample surface.

15. The method according to claim 14, wherein steps a. and b. further comprise the sequence of steps:
  g. in step b.: activating the second actuator;
  h. in step b.: deactivating an amplitude closed-loop control by switching a scan-hold circuit arrangement from a scan mode to a hold mode;
  i. in step b.: deactivating the first actuator if an amplitude of the natural oscillation of the measuring probe drops below a predetermined threshold;
  j. in step a.: determining a vertical position of the measuring tip of the measuring probe after detecting a contact of the measuring tip with the sample surface;
  k. in step a.: deactivating the second actuator and awaiting a predetermined time duration until there is a loss of contact between the measuring tip of the measuring probe and the sample surface;
  l. in step b.: activating the first actuator in phase; and
  m. in step b.: activating the amplitude closed-loop control by switching the scan-hold circuit arrangement from the hold mode to the scan mode.

16. The method according to claim 14, wherein detecting a contact between the measuring tip of the measuring probe and the sample surface comprises the determination of a vertical position of the measuring tip of the measuring probe at this point.

17. The method according to claim 13, further having the step of:
  determining a switch-on time for the in-phase activation of a first actuator from a decay curve of the natural oscillation of the measuring probe without activation of the first actuator.

18. A non-transitory computer-readable medium storing a computer program comprising instructions which, when executed by a computer system, prompt the computer system in combination with a scanning probe microscope to carry out a method for increasing a scan speed of the scanning probe microscope operating in a step-in scan mode, the method comprising the following steps:
  (a) scanning a measuring probe over a sample surface in a step-in scan mode;
  (b) exciting the measuring probe to carry out a natural oscillation during the step-in scan mode by way of a self-oscillation circuit arrangement; and
  (c) setting a phase of the excitation relative to the natural oscillation of the measuring probe by use of a phase shifter of the self-oscillation circuit arrangement, wherein the phase shifter is configured to set the excitation with a phase difference in relation to a best possible excitation of the natural oscillation of the measuring probe in the range of ±30°; and
  wherein the self-oscillation circuit arrangement comprises an automatic gain closed-loop control configured to set an amplitude of the natural oscillation of the measuring probe.

19. The non-transitory computer-readable medium of claim 18 in which steps (a) and (b) comprise:
  (d) in step (b): activating a first actuator configured to transfer the excitation of the self-oscillation circuit arrangement to the measuring probe;
  (e) in step (a): activating a second actuator configured to change a distance between a measuring tip of the measuring probe and a sample surface; and
  (f) in step (a): detecting a contact between the measuring tip of the measuring probe and the sample surface.

20. The scanning probe microscope of claim 1 in which the best possible excitation of the natural oscillation of the measuring probe is achieved if the excitation signal and the natural oscillation have a phase difference of substantially 90°.

21. The scanning probe microscope of claim 1 in which the self-oscillation circuit arrangement is configured to:
  upon detecting contact between the measuring probe and the sample, switch off transfer of the excitation of the self-oscillation circuit arrangement to the measuring probe; and
  after waiting for a period of time, switch on the transfer of the excitation of the self-oscillation circuit arrangement to the measuring probe.

22. The scanning probe microscope of claim 21 in which the period of time is determined based on a decay curve of the natural oscillation of the measuring probe without activation of the transfer of the excitation of the self-oscillation circuit arrangement to the measuring probe.

23. The scanning probe microcope of claim 1 in which the shase shifter is configured to set the excitation with a phase different in relation to the best possible excitation of the natural oscillation of the measuring probe in the range of ±10°.

24. The scanning probe microscop of claim 1 in which the phase shifter is configured to set the excitation with a phase difference in relation to the best possible excitation of the natural oscillation of the measuring probe in the range of ±5°.

25. The scanning probe microscope of claim 1 in which the amplitude of the natural oscillation of the measuring probe comprises a range of 5 nm to 700 nm.

26. The scanning probe microscope of claim 1 in which the amplitude of the natural oscillation of the measuring probe comprises a range of 10 nm to 500 nm.

27. The scanning probe microscope of claim 1 in which the amplitude of the natural oscillation of the measuring probe comprises a range of 20 nm to 200 nm.

* * * * *